(12) United States Patent
Fujii

(10) Patent No.: US 9,552,808 B1
(45) Date of Patent: Jan. 24, 2017

(54) DECODING PARAMETERS FOR VITERBI SEARCH

(71) Applicant: Google Inc., Mountain View, CA (US)

(72) Inventor: Yasuhisa Fujii, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 143 days.

(21) Appl. No.: 14/552,779

(22) Filed: Nov. 25, 2014

(51) Int. Cl.
*G10L 15/00* (2013.01)
*G10L 15/06* (2013.01)

(52) U.S. Cl.
CPC ..................................... *G10L 15/06* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 6,374,220 B1 | 4/2002 | Kao | |
| 6,601,215 B1 * | 7/2003 | Thurnhofer | H03M 13/4169 714/795 |
| 6,657,800 B1 | 12/2003 | Ozdemir | |
| 7,522,678 B2 | 4/2009 | Ashley | |
| 8,150,160 B2 | 4/2012 | Al-Muhtaseb | |
| 8,170,289 B1 | 5/2012 | Feng | |
| 8,543,895 B2 | 9/2013 | Wang | |
| 2004/0254790 A1 * | 12/2004 | Novak | G10L 15/08 704/240 |
| 2005/0149326 A1 * | 7/2005 | Hogengout | G10L 15/08 704/242 |
| 2008/0091429 A1 * | 4/2008 | Badt | G10L 15/197 704/255 |
| 2009/0089648 A1 | 4/2009 | Tsui | |

OTHER PUBLICATIONS

Lingyum, Xie et al. "Efficient Viterbi Beam Search Algorithm Using Dynamic Pruning", ICSP 2004 Proceedings, 4 pages.

* cited by examiner

*Primary Examiner* — Jesse Pullias
(74) *Attorney, Agent, or Firm* — Fish & Richardson P.C.

(57) ABSTRACT

Methods, systems, and apparatus, including computer programs encoded on a computer storage medium, for decoding parameters for Viterbi search are disclosed. In one aspect, a method includes the actions of receiving lattice data that defines a plurality of lattices. The actions include for each defined lattice determining a particular path that traverses the lattice; determining a node cost of a path from the start node to the frame node; determining a beam size for each frame; determining a beam cost width for each frame; determining a maximum beam size from the beam sizes determined for frames; and determining a maximum beam cost width from the beam cost widths determine for the frames. The actions include selecting a particular beam size and a particular beam cost width. The actions include determining paths for additional lattices using the pruning parameters of the particular beam size and the particular beam cost width.

20 Claims, 12 Drawing Sheets

DECODING PARAMETERS FOR VITERBI SEARCH

TECHNICAL FIELD

This specification generally relates to dynamic programming.

BACKGROUND

A time-synchronous Viterbi search is widely used in Hidden Markov Model (HMM) based pattern recognition systems, such as speech recognition and optical character recognition (OCR). Such decoding algorithms are used to efficiently search for a "best" hypothesis from among many different possible hypotheses.

It is, however, infeasible to evaluate all the hypotheses in most cases. Thus, the decoding algorithm employs some pruning algorithms to reduce the number of hypotheses evaluated. Such pruning algorithms usually come with tunable parameters. Those parameters are optimized so that the decoding with the parameters satisfies a condition required by an application in mind. When performing optical character recognition or speech recognition, a computing device may use hidden Markov models to assist in identifying the letters or words.

SUMMARY

In general, an innovative aspect of the subject matter described in this specification may be embodied in methods that include the actions of receiving lattice data that defines a plurality of lattices, each lattice beginning with a start node and ending in an end node, wherein the start node and the end node are separated by one or more frames, each frame having corresponding frame nodes, wherein the nodes of each frame are connected to nodes of other frames, the start node or the end node by directional arcs, each directional arc corresponding to a respective weight. The actions further include, for each defined lattice: determining a particular path that traverses the lattice, wherein the particular path identifies a particular directional arc in each frame and defines a path from the start node to the end node; at each frame node, determining a node cost of a path from the start node to the frame node, the node cost based on the respective weights of the directional arcs in the path from the start node to the frame node; determining a beam size for each frame, wherein the beam size corresponds to the number of frame nodes in the frame having an node cost equal to or less than the node cost of the frame node that is in the particular path; determining a beam cost width for each frame, wherein the beam cost width corresponds to a difference between the node cost of the frame node that is the particular path and a minimum of the node costs of the frame nodes in the frame; determining a maximum beam size from the beam sizes determined for frames; and determining a maximum beam cost width from the beam cost widths determine for the frames. The actions further include ranking the maximum beam sizes determined from the lattices; ranking the maximum beam cost widths determined from the lattices; selecting a particular beam size and a particular beam cost width that corresponds to a particular percentile of the ranked maximum beam sizes and the ranked maximum beam cost widths and storing them as pruning parameter values; and determining paths for additional lattices using the pruning parameters of the particular beam size and the particular beam cost width to prune candidate paths.

Other embodiments of this aspect include corresponding systems, apparatus, and computer programs recorded on computer storage devices, each configured to perform the operations of the methods.

These and other embodiments can each optionally include one or more of the following features. The particular path is a Viterbi path. The start node of each lattice connects to frame nodes of a first frame. The end node of each lattice connects to frame nodes of a last frame. The node cost of a frame node corresponds to a sum of the respective weights of the directional arcs in the path from the start node to the frame node. Each frame of each lattice corresponds to at least a portion of a letter of text. Each frame of each lattice corresponds to at least a portion of a word of a spoken utterance. A direction associated with each directional arc points from the start node of each lattice to the end node of each lattice. The action of determining paths for additional lattices using the pruning parameters of the particular beam size and the particular beam cost to prune candidate paths includes, for each additional lattice and in each frame of each additional lattice: pruning one or more frame nodes that are each associated with a node cost that is greater than a minimum node cost plus the particular beam cost width; and pruning a number of frame nodes that are each associated with a node cost that is greater than a node cost of a frame node with the lowest node cost, wherein the number of frame nodes is equal to the particular beam size.

Particular embodiments of the subject matter described in this specification can be implemented so as to realize one or more of the following advantages. A device preforming the techniques described in this specification does not have to analyze all of the data to determine an acceptable output. These techniques allow for different decoding parameters such as beam size and beam cost width to be identified and applied to different data corpora. These techniques allow a user to trade off accuracy for speed with human understandable parameters.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
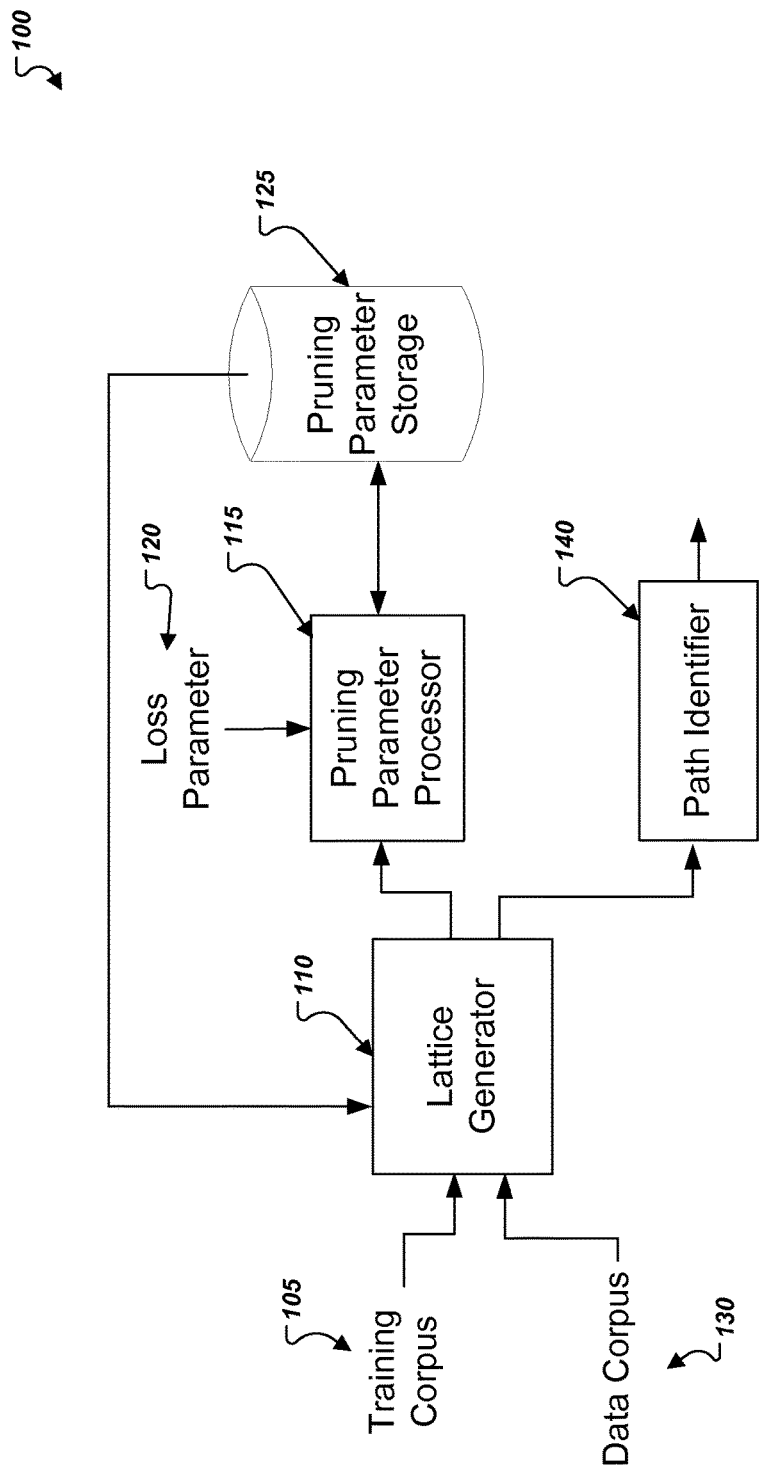
FIG. 1A is a diagram of an example system that uses decoding parameters for Viterbi search.

The systems and methods described below are used to derive decoding parameters for a Viterbi search algorithm. Example implementations are described in the context of optical character recognition or speech recognition; however, the systems and methods can be used in a variety of other appropriate applications.

During a speech recognition process, for example, a computing device detects a spoken utterance. The utterance corresponds to particular words but the device does not know what the words are. The device can analyze the utterance and determine a likely series of words that corresponds to the utterance. To do so, the device computes a probability that each portion of the utterance corresponds to a particular word. For example, the computing device may determine that the first word is either "the" or "be" with the utterance more closely matching "the." The device may determine that the second work is either "smell" or "well" with the utterance more closely matching "well." Instead of determining that the utterance is "the well," the computing device may use hidden Markov models to compute the overall most likely words. In a hidden Markov model, each probability may be linked to a following probability. The device may compute a different probability for "smell" and "well" depending if the first word is "the" or "be."

Using hidden Markov models produces a lattice that grows larger with each word. In the above example, both "the" and "be" have connections to a different "smell" and "well." Each connection corresponds to a probability. If the first word is "the," then it is more likely that the second word is "smell" instead of "well." Similarly, if the first word is "be," then it is more likely that the second word is "well" instead of "smell." Using the conditional probabilities, the device may compute that the words with the highest overall probability is "be well" even though in isolation, the first word is more likely "the."

For larger examples, the lattice contains many paths that each correspond to a portion of the utterance and not necessarily to different words because the border between words may not be clear. The path that includes the highest probability total is the Viterbi path. In instances where the computing device is analyzing many lattices and determining the Viterbi paths for each lattice, the computing device may use information from a group of lattices to remove, or prune, some of the paths in the other lattices.

One technique to prune paths from some lattices is to analyze each frame of a lattice for which the computing device has determined the Viterbi path. A frame for each lattice does not necessarily correspond to the item of information that the device is trying to identify. In each frame, the device identifies two quantities, beam size and beam cost width. The beam size is the number of connections that have a higher probability than the connection that corresponds to the Viterbi path. The beam cost width is the difference between the probability that corresponds to the connection of the Viterbi path and the connection with the highest probability. For each lattice, the device computes the highest beam cost width and beam size for all the frames of the lattice. The device performs this computation for a group of lattices.

Once the device computes the highest beam cost width and the highest beam size for a group of lattices, the device uses a user defined parameter to select a beam size and beam cost width that correspond to a particular percentile. The device uses the identified beam size and beam cost width to reduce the size of the lattice that have not yet been analyzed. As noted above, each frame has one or more connections with the highest probability. Before identifying the Viterbi path of a lattice, the device may prune the connections that are outside of the identified beam size, the identified beam cost width, or both. Pruning the connections reduces the possible paths so that device analyzes fewer paths to determine the Viterbi path.

These features and other features are described in more detail below.

Figure 6:
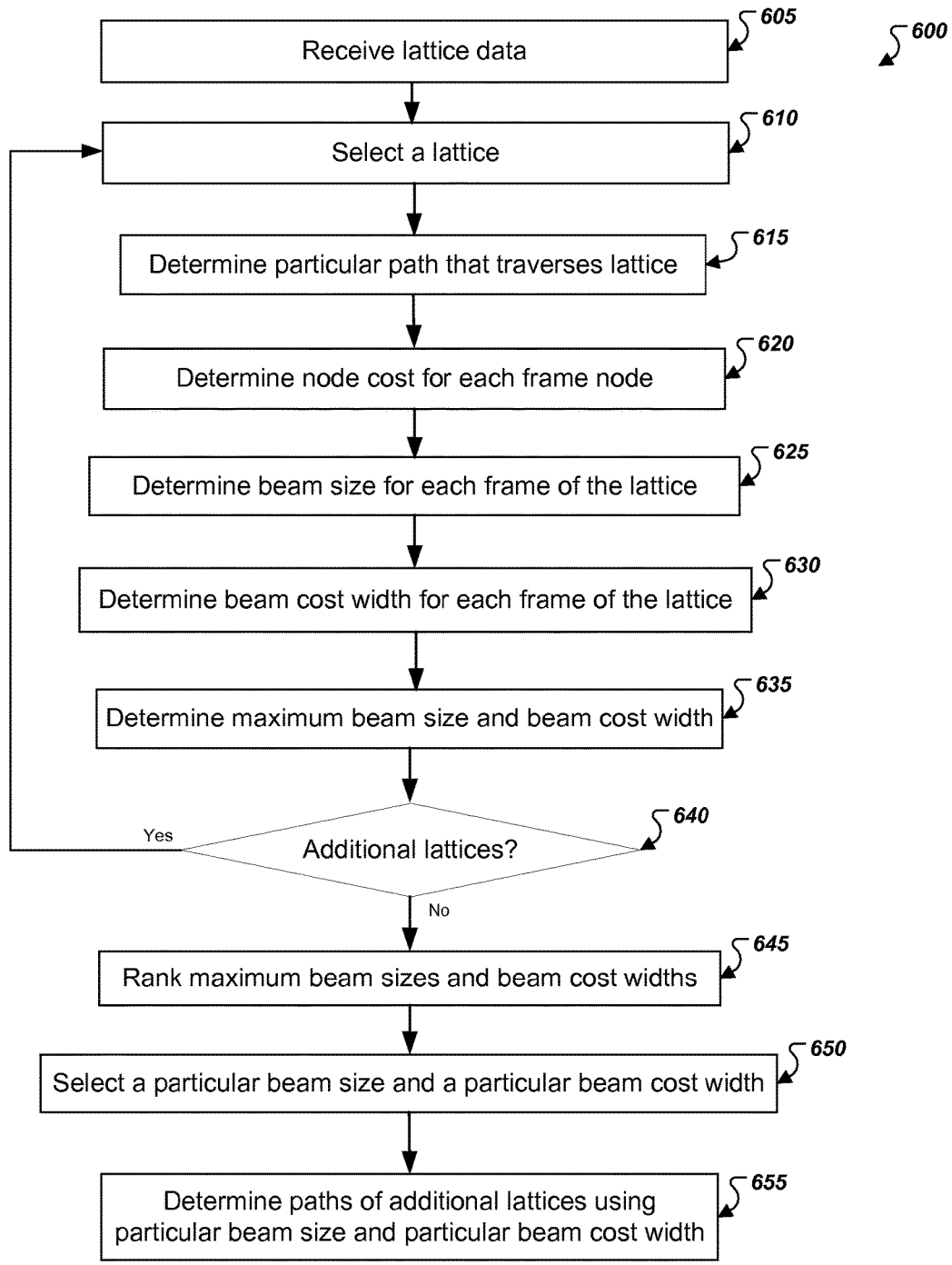
FIG. 6 is a diagram of an example process for using decoding parameters for Viterbi search.

FIG. 1A is a diagram of an example system 100 that uses decoding parameters for Viterbi search. In general, the system 100 performs the process 600 of FIG. 6 to identify decoding parameters that can be used to prune paths from lattices. In some implementations, each lattice represents data that corresponds to speech recognition or optical character recognition data. The system 100 performs process 600 to determine characters that correspond to the optical character recognition data or to determine words that correspond to the speech recognition data. In performing process 600, the system 100 computes decoding parameters to prune each lattice to reduce the computational cost associated with each lattice.

The system 100 may be implemented using any type of computing device such as laptop computer, a desktop computer, a mobile phone, a tablet, an appliance, or any other computing device that is configured to recognize speech or identify written or printed characters. The system 100 may also be implemented in a cloud-based computing system. The system 100 may perform the process 600 using one or more processing devices in data communication with computer readable medium of the computing device.

The system 100 accesses a training corpus 105. The training corpus 105 may be data that is associated with the data that the system 100 is analyzing. For example, the training corpus 105 may be a portion of the data that the system 100 is performing optical character or speech recognition on. In some implementations, the portion may be a percentage of the data. For example, the training corpus 105 may be ten percent of the data that the system 100 is analyzing. In some implementations, the portion may be a fixed amount. For example, the training corpus 105 may be data that corresponds to ten seconds of human speech.

The lattice generator 110 processes the training corpus 105 and generates lattice data based on the training corpus 105. Each lattice corresponds to training data from the training corpus 105. The training data may correspond to an image of text data or speech data, or a similar type of data. A sequence of frames are extracted from the training data. Each frame has a frame width and corresponds to a particular portion of the training data with the frame width. The frame width may or may not corresponds to a particular word, letter, or character of the training data. In some implementations, the system 100 may access empirical data that indicates an approximate width of a written or printed character and may use the data when determining the frame width.

Each lattice includes directional arcs, or just arcs, that connects various nodes. Each node in the lattice represents a hypothesis that is a sequence of labels and a corresponding probability at a frame. Each arc in a lattice connects two nodes in the lattice with some probability or cost. The probability is inversely proportional to the cost such that a lower cost indicates a higher probability that the hypothesis associated with the following node is more plausible. In some implementations, the probability of the hypothesis is computed by multiplying or summing all the costs of the arcs along the path that leads to the node from the initial node. The cost of an arc represents how likely the arc is associated with the frame of the following node. For example, if the lattice generator 110 is scanning a written letter b, then the nodes of the frame correspond to the possible hypotheses, or letters, that the written letter b corresponds to.

Figure 1B:
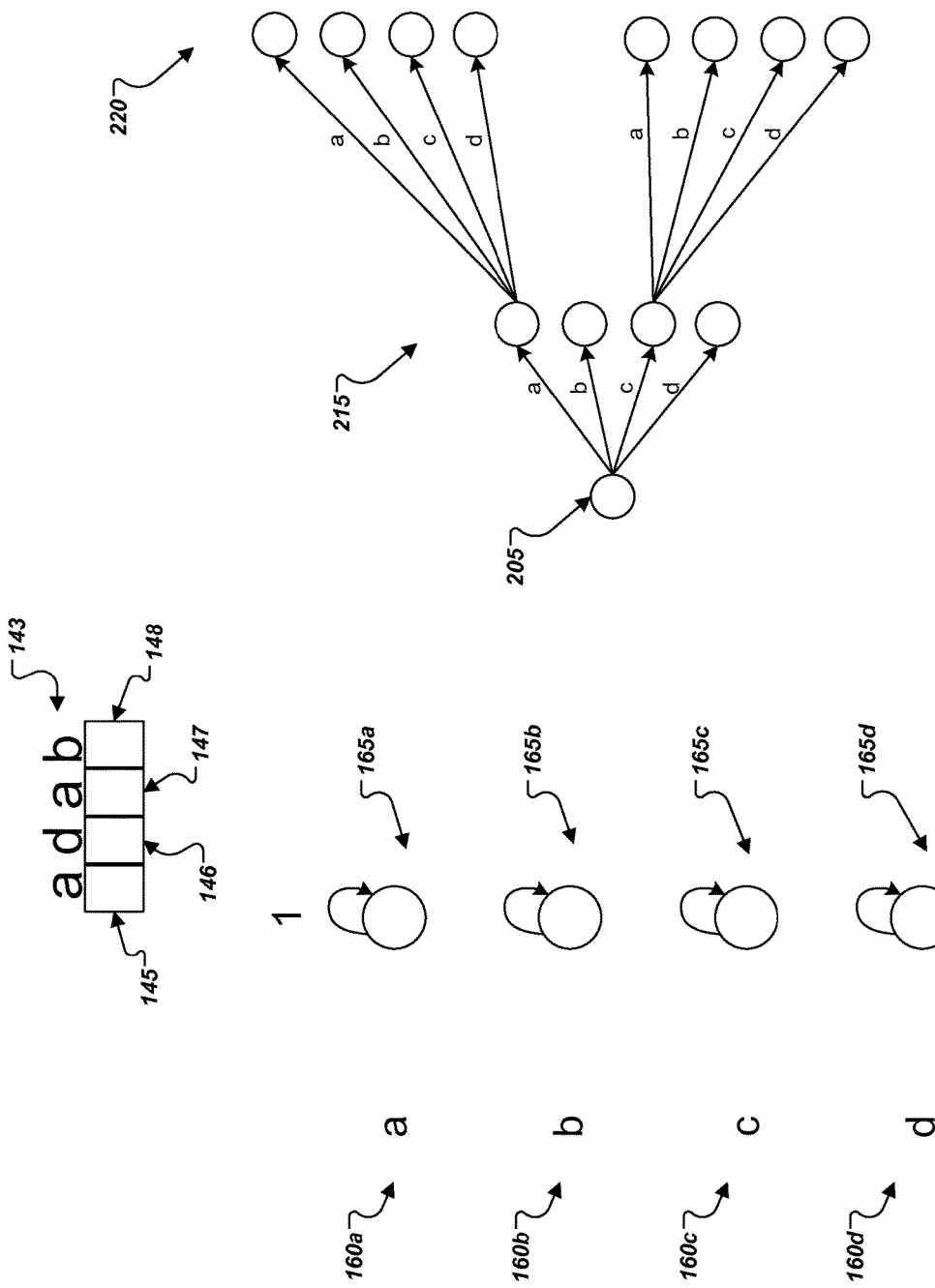
FIGS. 1B and 5A are diagrams of example lattice generation operations.

FIG. 1B is an example diagram of a lattice generation operation. In FIG. 1B, the lattice generator 110 is scanning the line text image 143 that corresponds to written characters adab and generating a lattice for the image. In this example, the possible characters are a, b, c, and d. When applying this technique to other written or printed text that includes other characters, additional possible characters may be added such as other letters of the alphabet or numbers. The lattice generator 110 first scans the line image 143 that is in frame 145 and generates lattice nodes which correspond to a frame 215 and are connected to the start node 205. Each possible output letter 160a to 160d is included in the lattice frame 215. States 165a to 165d indicate the sequence of states for each output letter 160a to 160d. The states 165a to 165d each correspond to a hidden Markov model with one state. Each output letter 160a to 160d only includes one state. An example with output letters with multiple states is discussed below.

The lattice generator 110 scans the next frame 146 and adds nodes correspond to a frame 220 to the lattice. Each node of frame 215 is connected to the nodes that correspond to the possible hypotheses for the letter of frame 146, but each node is not shown in the lattice to avoid congestion. The lattice generator 110 continues to scan frames 147 and 148 of text 143 and adds additional frames to the lattice.

Figure 2:
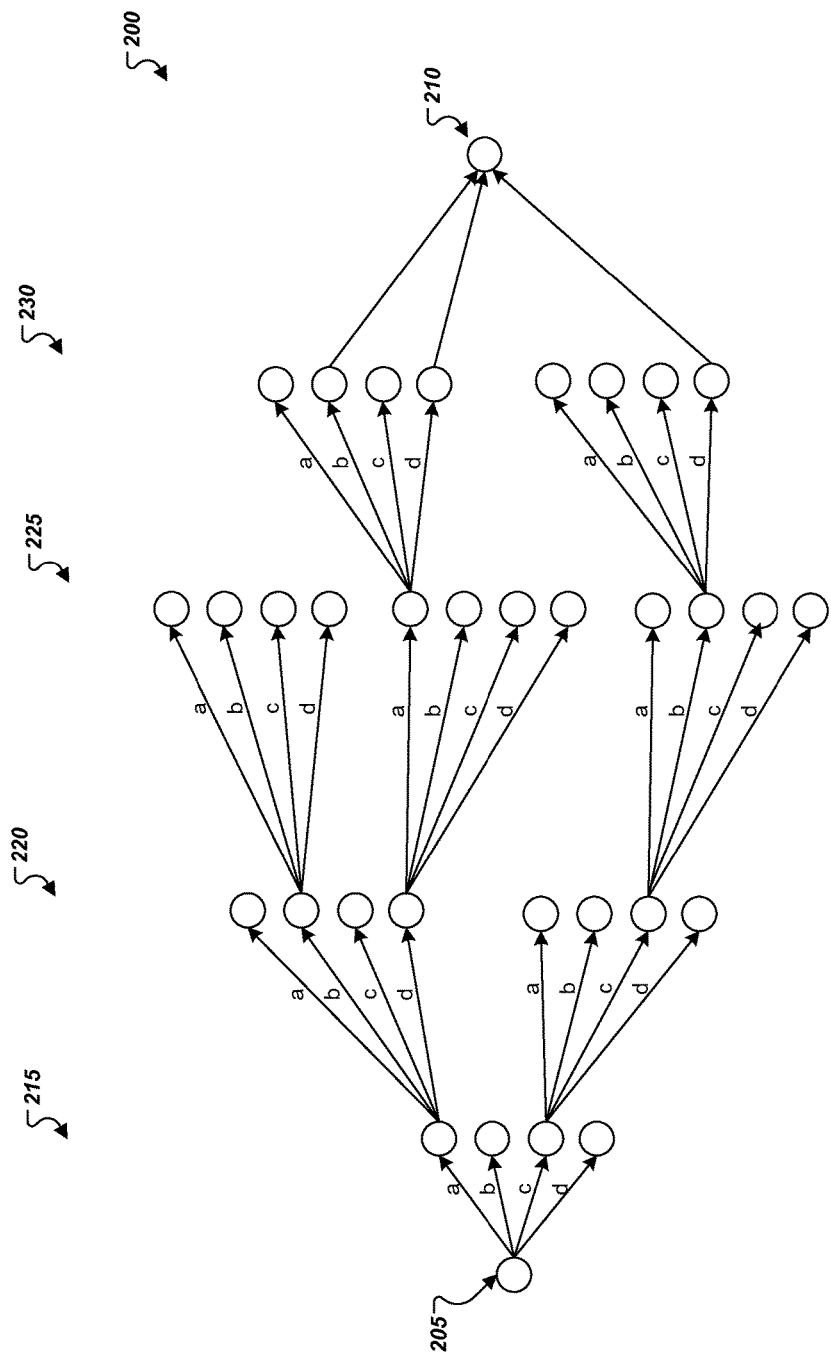
FIGS. 2-4 and 5B-5D are example lattices that use decoding parameters for Viterbi search.

FIG. 2 is an example lattice 200 that uses decoding parameters for Viterbi search. The lattice 200 is a lattice generated by the lattice generator 110 when scanning line image 143 using frames 145 to 148. The lattice 200 includes a start node 205 and an end node 210. In between the start node 205 and the end node 210 are frames 215, 220, 225, and 230. Each frame includes a group of nodes that connect to nodes of other frames with directional arcs. In lattice 200, the directional arcs point in the direction from the start node 205 to the end node 210. Each node is associated with a particular sequence of hypotheses or a sequence of labels, e.g., labels are a, b, c, and d and a sequence of hypotheses may be bda. More or fewer labels may be used and thus generating additional nodes in each frame, depending on the data. For example, when analyzing a line image data which corresponds to a written text data that probably only includes the letters a to z, twenty-six labels may be used. In lattice 200, only four letters are possible for line image 143. The lattice 200 includes arcs that originate at each node, but are not shown to avoid congestion. Frame 220 shows eight nodes but includes eight additional nodes that are not shown, four that are connected to label b of frame 215 and four that are connected to label d of frame 215. Other nodes are also omitted from the lattice 200 in frame 225 and 230.

Each path that traverses the lattice corresponds to a different permutation of the labels. For example, a path may correspond to aaaa, abcd, dcbd, or any other permutation of a, b, c, and d. As noted above, some of the paths in lattice 200 are not included to avoid congestion in the drawing. Thus, while the node that corresponds to label b of frame 215 does not have any directional edges originating from it, the directional edges still exist but are not included in illustration of lattice 200.

Figure 3A:
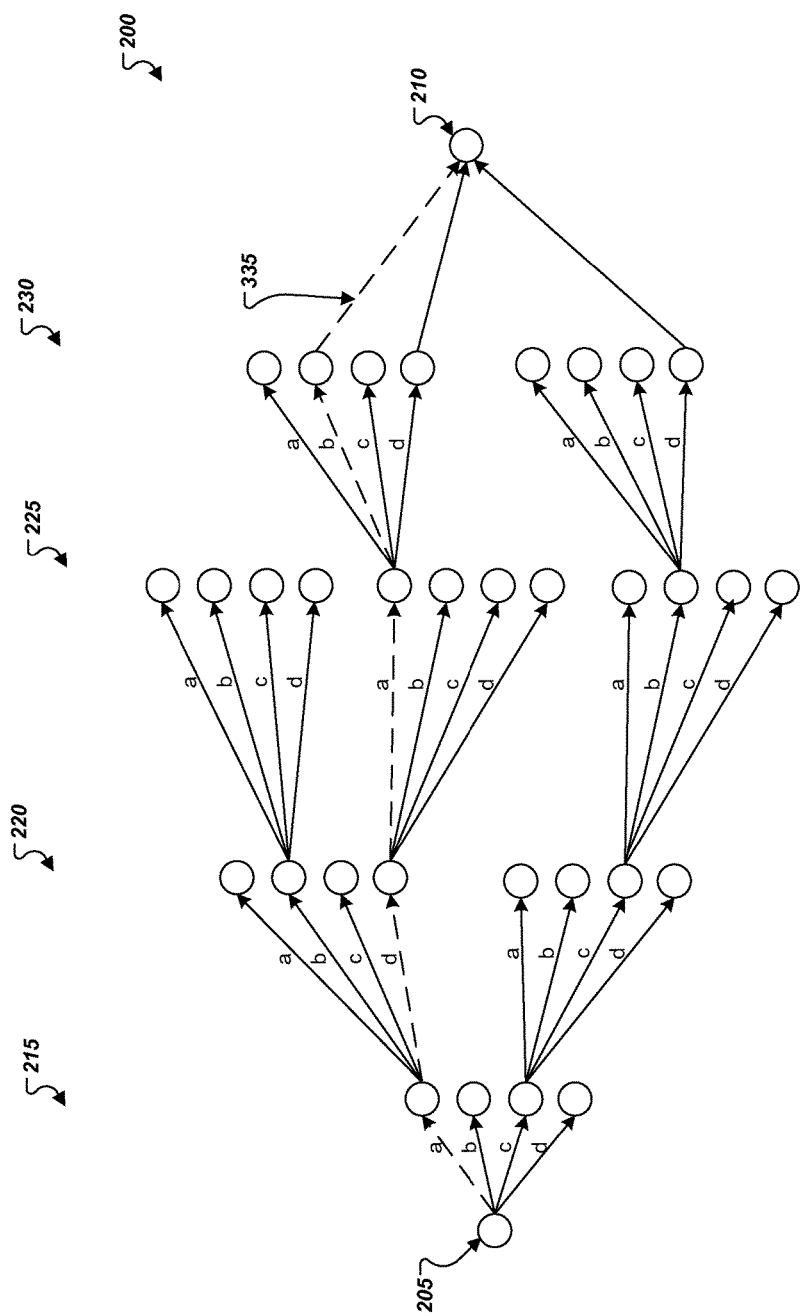
Figure 3B:
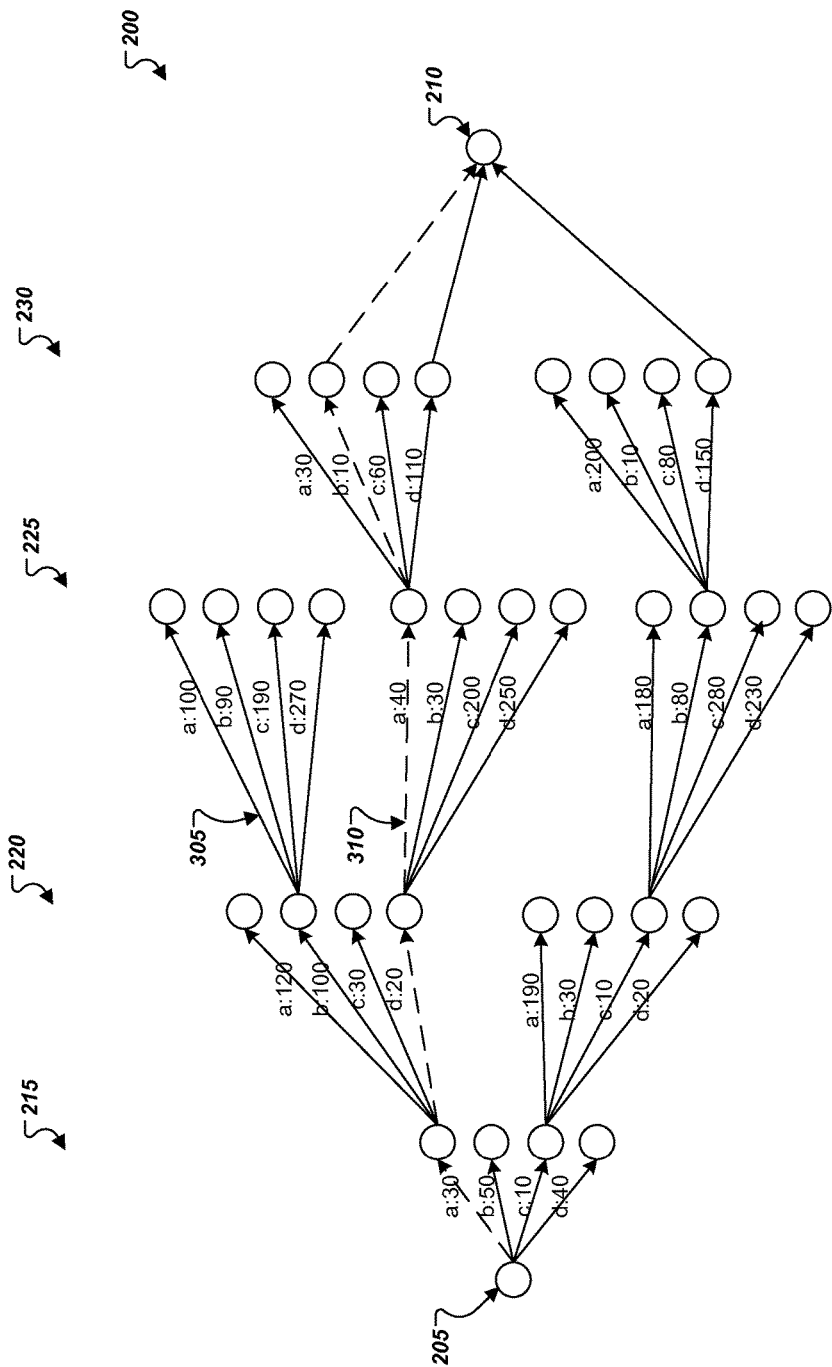

The pruning parameter processor 115 receives the lattices from the lattice generator (605) and selects a lattice (610), and then determines a particular path that traverses the lattice (615). FIG. 3 illustrates that the pruning parameter processor has determined a path 335 that traverses the lattice. In some implementations, the path 335 is the Viterbi path that traverses the directional arcs with the lowest overall weight, or cost. The Viterbi path indicates the sequence of characters that most likely corresponds to text 143. The path 335 is illustrated by a dashed line and corresponds to labels adab.

The lattice generator 115 determines directional arc costs for each of the directional arcs in the lattice 200. The directional arc cost, or weight, is related the probability that the label that corresponds to the directional arc is corresponds to the letter in the frame of the written text. A greater arc cost for a directional arc indicates a lower probability. The arc cost may be dependent on the previous context. In the example, the previous context is represented the previous node and the sequence of labels or hypotheses for that node. For example, in frame 225, the arc cost of arc 305 is one hundred and the arc cost of arc 310 is forty. Both the arcs 305 and 310 correspond to costs associated with the letter in frame 147, but because arc 305 follows nodes corresponding to labels ab and arc 310 follows nodes corresponding to ad, the cost of arc 305 and 310 are different.

The lattice generator 115 determines a node cost for each node (620). In some implementations, the node cost is the cumulative cost of the weights, or costs, of a path from the start node to the current node. For example, the node cost of node 405 is the sum of the cost of directional arc associated with label b in lattice frame 215, which is fifty, plus the cost of the directional arc associated with the label c in lattice frame 220, which is twenty, for a total of seventy. Similarly, the node cost of the node 410 is the sum of a path from the start node to the current node, which only traverses the directional arc associated with the label c in lattice frame 215, for a node cost of ten. The node cost of the node 415 is the sum of the costs of the directional arcs along the path that follows labels adab for a total of one hundred. Notice that the cost of node 415 is the lowest in lattice frame 230 because the path is the Viterbi path.

Figure 4:
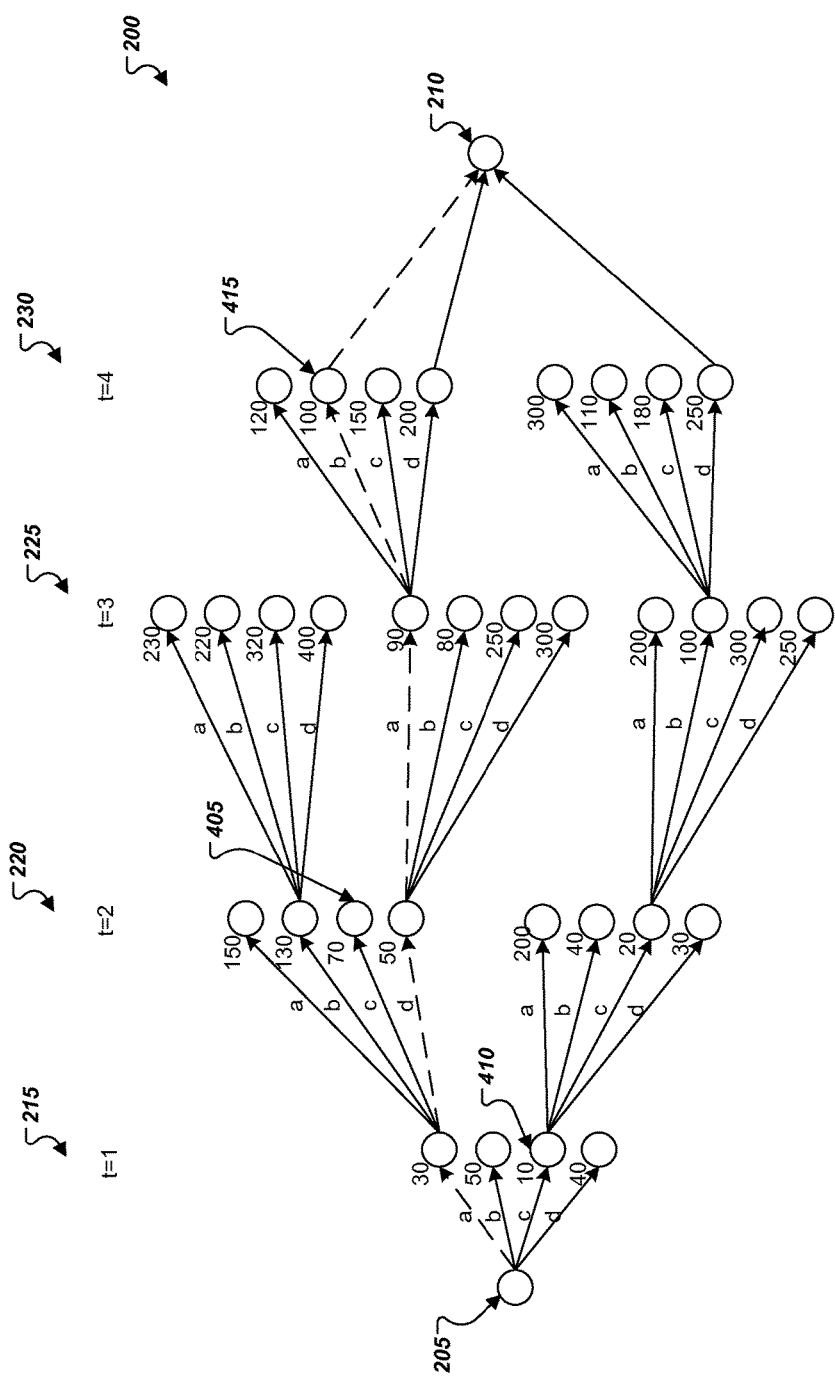

The pruning parameter processor 115 determines a beam size for each frame (620). The beam size for a particular lattice frame is the number of nodes that have a node cost that is less than or equal to the node cost associated with node in the previously identified path. Referring to FIG. 4, the beam size for lattice frame 215 is two because the node cost of the previously identified path is thirty, and there exists one node with a lower cost, the node in lattice frame 215 that corresponds to label c. The beam size for frame 220 is four because the node cost of the previously identified path is fifty, and there exist three nodes with a lower node cost than fifty, particularly the nodes with nodes costs of twenty, thirty, and forty. The beam size for frame 225 is two because the arc cost for the path is ninety, and there exists one path with a lower cost than ninety. The beam size for frame 230 is one because the arc cost of the path is one hundred, and there are no paths with a lower arc cost than one hundred in frame 230.

The pruning parameter processor 115 determines a beam cost width for each frame (625). The beam cost width corresponds to the difference between the node cost of the previously identified path and the lowest node cost in that frame. The beam cost width for lattice frame 215 is the difference between the node cost of the node along the previously identified path and the lowest node cost in lattice frame 215. Therefore, the beam cost width for lattice frame 215 is twenty. The beam cost width for lattice frame 220 is the difference between the node cost of the node along the previously identified path, fifty, and the lowest node cost, twenty, for a beam cost width of thirty. The beam cost width for lattice frame 225 is the difference between the node cost of the node along the previously identified path, ninety, and the lowest node cost in lattice frame 225, eighty, for a beam cost width of ten. The beam cost width of lattice frame 230 is zero, because the arc cost of the previously identified path is the lowest arc cost.

The following Table 1 summarizes the beam sizes and beam cost widths for the FIG. 4.

TABLE 1

| Frame | 215 | 220 | 225 | 230 |
|---|---|---|---|---|
| Beam size | 2 | 4 | 2 | 1 |
| Beam cost width | 20 | 30 | 10 | 0 |

The pruning parameter processor 115 identifies a maximum beam size and maximum beam cost width for the lattice (635). Following the example shown in Table 1, the maximum beam size is four and the maximum beam cost width is thirty. Once the pruning parameter processor 115 identifies the maximum beam size and beam cost width for the lattice, the pruning parameter processor 115 stores the maximum beam size and maximum beam cost width in the pruning parameter storage 125.

The pruning parameter processor 115 determines whether there are any additional lattices in the lattice data received from the lattice generator 110 (640). If there are additional lattices, then the pruning parameter processor 115 computes the maximum beam size and maximum beam cost width for the lattice and stores the values in the pruning parameter storage 125.

If there are no more additional lattices, the pruning parameter processor 115 retrieves the maximum beam sizes and maximum beam cost widths for the lattices of the training corpus and sorts the maximum beam sizes and the maximum beam cost widths (645). The following Table 2 shows sorted example beam sizes and sorted example beam cost widths.

TABLE 2

|  | Beam size | Beam cost width |
|---|---|---|
| 1 | 300 | 980 |
| 2 | 280 | 890 |
| 3 | 250 | 800 |
| ... | | |
| 100 | 1 | 0 |

Table 2 includes maximum beam sizes and maximum beam cost widths for one hundred lattices, but only the largest three and lowest value of maximum beam sizes and beam cost widths for the lattices are shown in Table 2. Each column (beam size and beam cost width) are respectively sorted, and thus the two values in a particular row may not correspond to the same lattice.

The pruning parameter processor 115 selects a particular beam size and particular beam cost width based on the loss parameter 120 (650). The loss parameter 120 is a user-defined value that indicates the acceptable loss when the particular beam size and particular beam cost width is applied the lattices associated with the training corpus 105. With a loss parameter 120 of 0.02, the pruning parameter processor 115 discards the top two percent of the sorted beam sizes and sorted beam cost widths and selects the beam size and beam cost width at the 98th percentile, which in Table 2 is a beam size of 250 and a beam cost width of 800.

The pruning parameter processor 115 stores the selected beam cost width and the selected beam size in the pruning parameter storage 125.

Once the pruning parameter processor 115 has identified the particular beam cost width and particular beam size for pruning additional lattices, the lattice generator 110 generates lattice data based on a data corpus 130. The data corpus 130 may be the remainder of the data that was not used in the training corpus 105 or could be new data. In some implementations, the data should be from a similar source as the training corpus. For example, if the system 100 was performing speech recognition, then the training data 105 and the data corpus 130 should be from the same speaker using the same computing device.

The lattice generator 110 generates lattices from the data corpus 130 using the particular beam cost width and particular beam size that were stored in the pruning parameter storage 125. The lattice generator 110 generates a lattice using a similar technique as the one illustrated in FIG. 1A, except in this instance, the lattice generator 110 applies the particular beam cost width and particular beam size at each frame. For example, the lattice generator 110 generates nodes based on the first frame of written or printed text. The lattice generator 110 only adds nodes to the lattice only if they satisfy the particular beam cost width and particular beam size. If the particular beam size is 250 and the particular beam cost width is 800, then the lattice generator will add 250 nodes that have a node cost that is 800 or less than the lowest node cost. The lattice generator 110 continues to add nodes for the subsequent frames and applies the particular beam cost width and particular beam size at each frame.

With the lattice generator 110 having generated a pruned lattice from the data corpus 130 with the particular beam cost width and particular beam size, the path identifier 140 identifies a path that traverses the pruned lattice (655). In some implementations, the path identifier 140 identifies the Viterbi path of the pruned lattice. However, there is no certainty that the Viterbi path of the pruned lattice is the same as the Viterbi path of the unpruned lattice because a node along the Viterbi path may have been pruned.

Figure 5A:
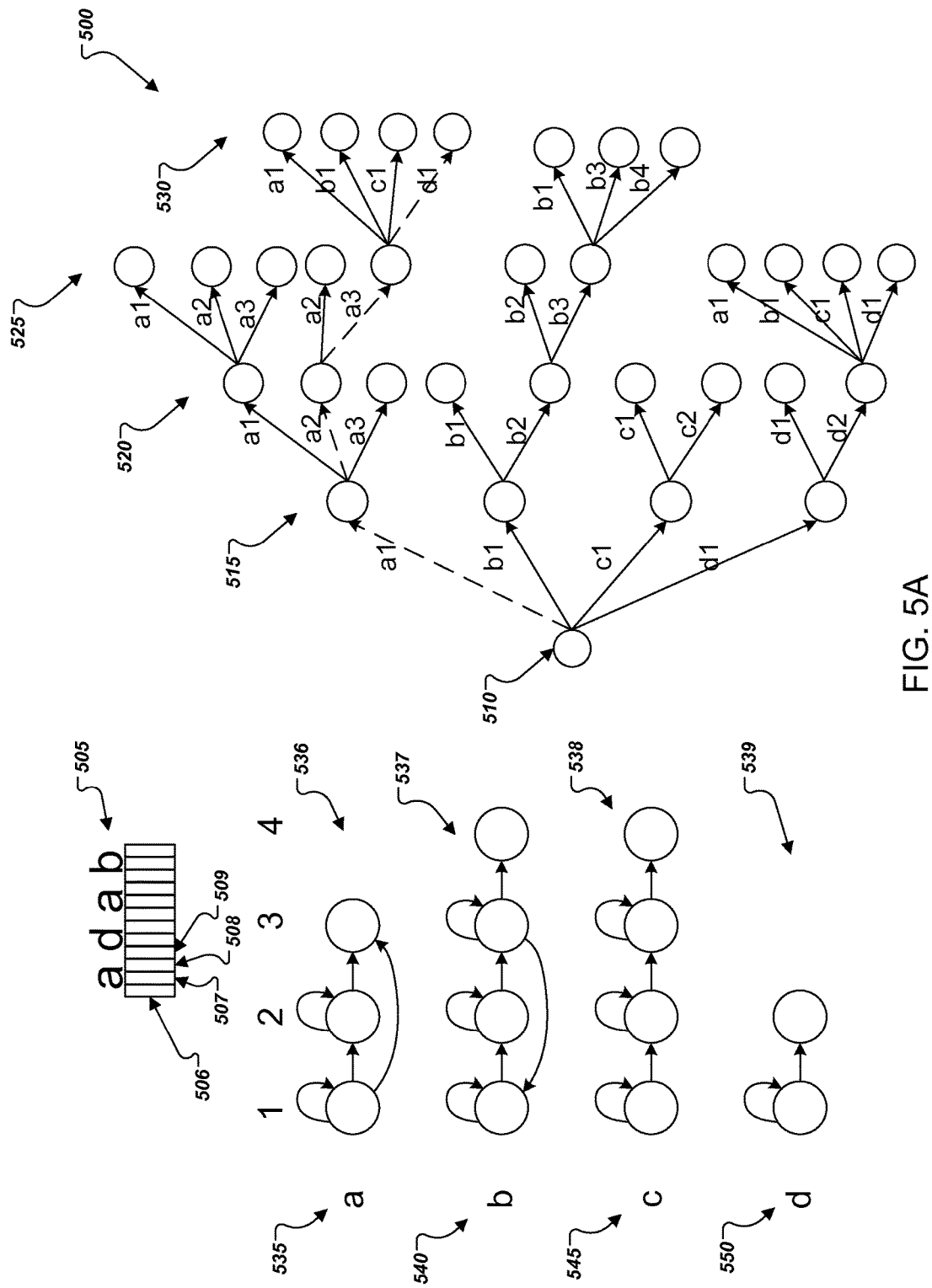

FIG. 5A is an example diagram of a lattice generation. Similar to FIG. 1B, the lattice generator 110 is scanning the text 505 that corresponds to the written characters adab and generating a lattice based on the text 505. Instead of a frame size that is approximately the width of a character, the frames in this example are smaller. The lattice generator 110 first scans the text 505 that is in frame 506 and generates nodes 515 corresponding to frame 506 that is connected to start node 510. A state for each possible letter, or more generally, label, 535 to 550 is included in the set of nodes corresponding to frame 515. In this example, the hidden Markov model that corresponds to each letter 535 to 550 includes multiple states. Three states 536 represent letter 535. Four states 537 represent letter 540. Four states 538 represent letter 545. Two states 538 represent letter 550. Each group of states includes an initial state and a final state. Some groups of states may include middle states. The initial state and the middle states may connect to any of the other states in the group.

To build the lattice, the lattice generator 110 scans text frame 506 and adds nodes of lattice frame 515 for each of the initial states for the letters 535 to 550. For nodes of lattice frame 520, the lattice generator scans text frame 507 and adds nodes for each of the states that connect to each of the states from nodes of lattice frame 515. For example, the initial state, a1, of states 536 is connected to the initial state, a1, a middle state, a2, and a final state, a3. The lattice generator 110 adds nodes for those states to nodes of lattice frame 520. The initial state, b1, of states 537 is connected to the initial state, b1, and a middle state, b2. The lattice generator 110 adds nodes for those states to nodes of lattice frame 520 for the node that corresponds to state b1. The lattice generator 110 add nodes that correspond to states c1, c2, d1, and d2 in a similar fashion to complete nodes of lattice frame 520.

For nodes of lattice frame 525, the lattice generator scans text frame 508 and adds nodes that correspond to the states that follow the states of nodes of lattice frame 520. To avoid congestion in the lattice, not all the nodes are illustrated in lattice frame 525. The node that corresponds to state d2 in nodes of lattice frame 520 is a final state in states 539. Because this state is a final state, the state transitions to the initial states of all the available characters, or labels. In this example, the nodes that corresponds to state d2 in nodes of lattice frame 520 connects to nodes that correspond to the initial states a1, b1, c1, and d1. The lattice generator 110 continues to follow this pattern to build the lattice and adds nodes of lattice frame 530 that corresponds to text frame 509. Again, not all nodes are illustrated in lattice frame 530 to avoid congestion.

Figure 5B:
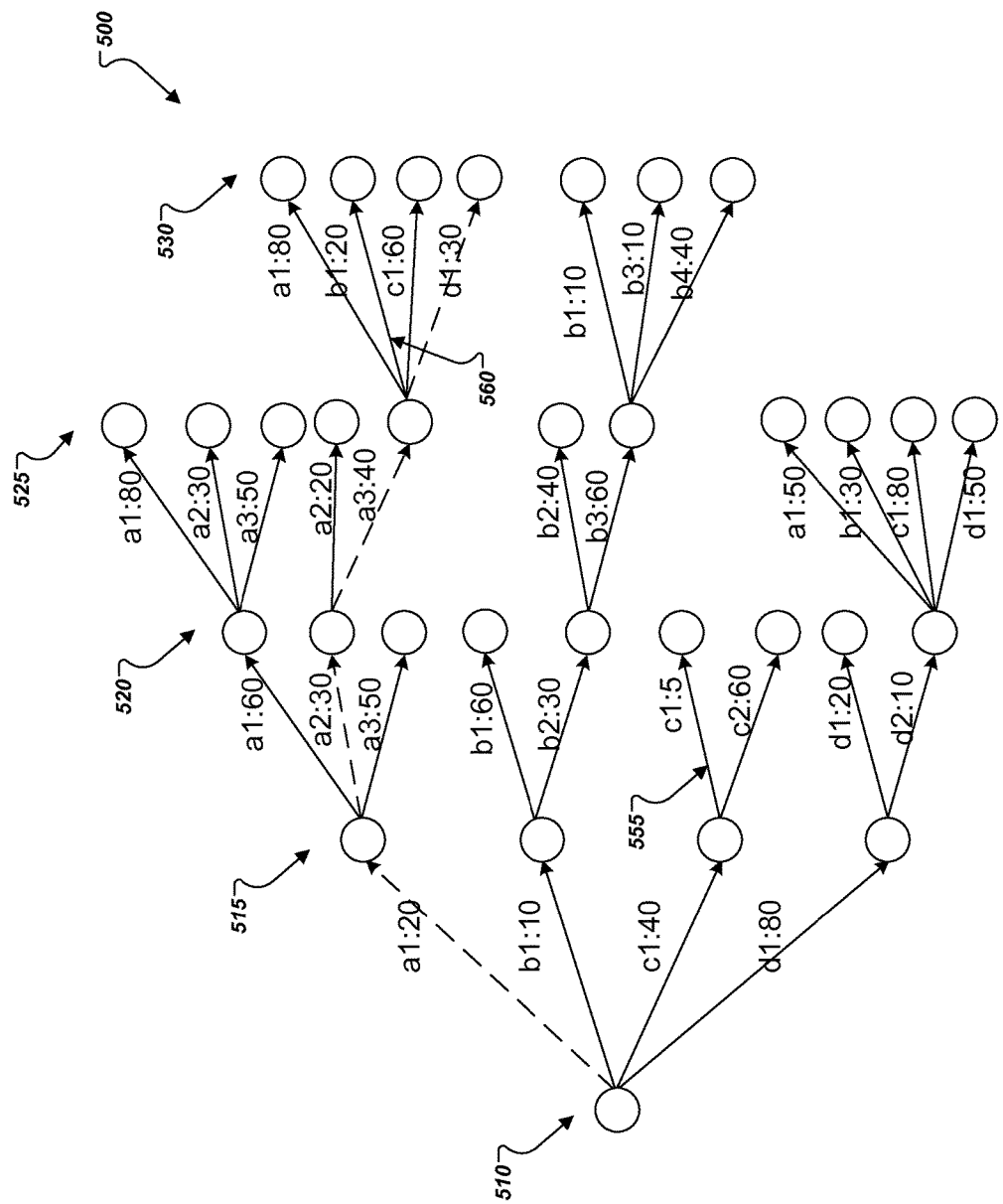

FIG. 5B illustrates an example lattice 500 with costs for each directional arc. The lattice 500 includes the costs, which is related to probability, that the particular state corresponds to the corresponding frame for written text 505. For example, the cost of directional arc 555 is related to the probability that state c1 corresponds to the written text in text frame 507. The cost of directional arc 560 is related to the probability that state b1 corresponds to the written text in text frame 509. While there are additional text frames for the lattice generator 110 to analyze, the lattice frames that correspond to those additional text frames are not included in lattice 500 because the lattice would be too large for the page. Thus, lattice 500 is not complete and does not include an ending node. Even though lattice 500 is not complete, a partial path of the Viterbi path is illustrated with a dashed line.

Figure 5C:
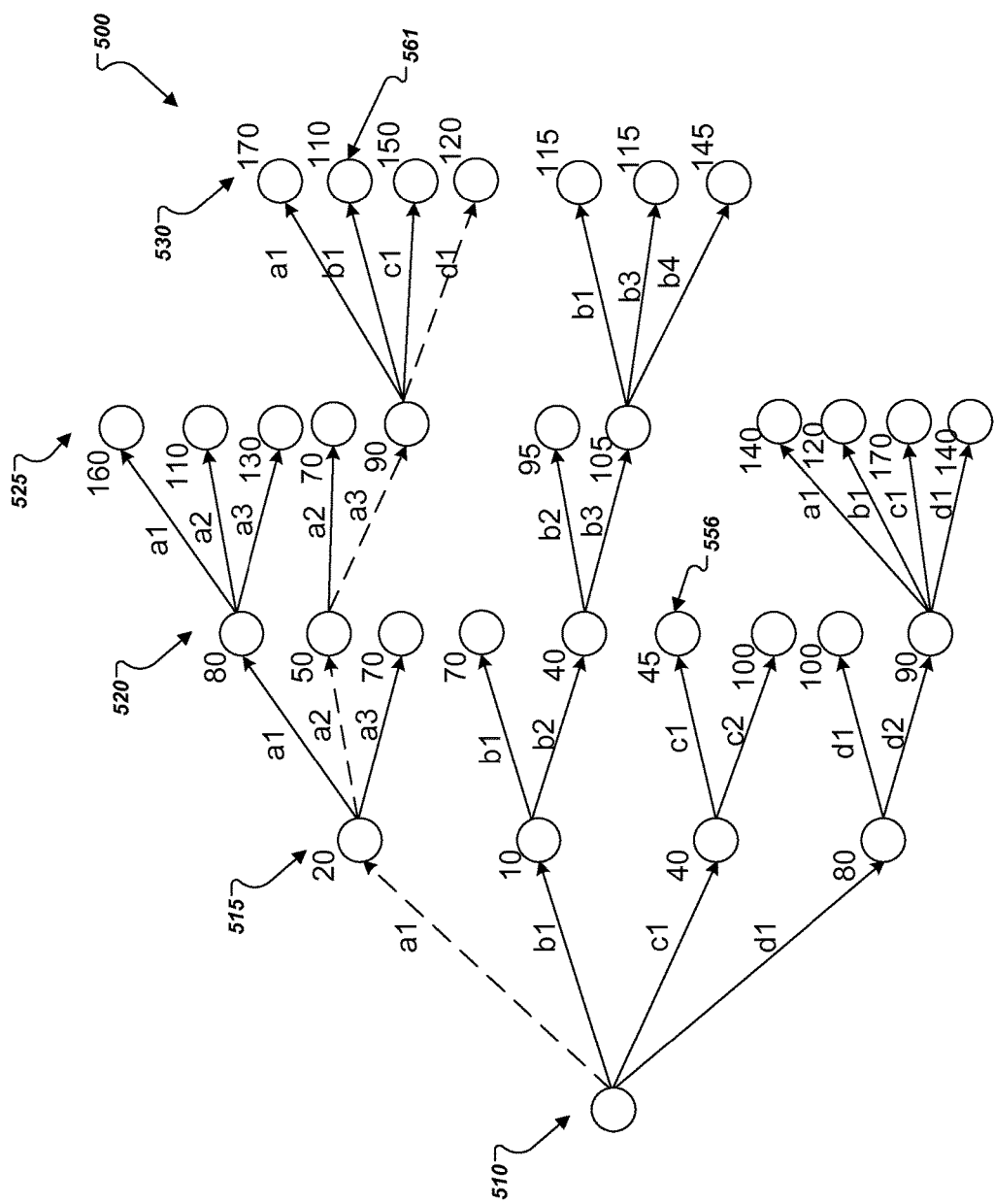

FIG. 5C illustrates the example lattice 500 with costs for each node. Similar to the lattice 200, the lattice generator 110 can compute a node cost for each node. The node cost is associated with the probability that a particular label sequence corresponds to the written text in the text frames. For example, the node cost of node 556 is related to the probability that the states c1c1 represent the text in text frames 506 and 507. The node cost of node 561 is related to the probability that the states a1a2a3b1 represent the text in text frame 506 to 509. In some implementations, the node cost for a node is the sum of the directions arcs from the start node to the node. The node cost of node 556 is 45, which is the sum of 40 and 5 from the costs associated with the c1c1 path in FIG. 5B. The node cost of node 561 is 110, which is the sum of 20, 30, 40, and 20 from the costs associated with the a1 a2a3b1. Notice that the Viterbi path that is indicated with the dashed path and corresponds to a1 a2a3d1 does not end on a node with the lowest cost. This is because the lattice 500 is not a complete lattice, the nodes of lattice frame 530 do not correspond to the final frame of the input for lattice 500.

The pruning parameter processor 115 computes the beam cost widths for the lattice 500 and other generated lattices. The pruning parameter processor 115 uses a similar method to select a particular beam cost width for lattice 500 as the beam cost width calculation method described above. The pruning parameter processor 115 uses a similar method because the lattice 500 and the lattice 200 are similar in that the nodes each correspond to states of different labels. In lattice 200, each label only had one state. In lattice 500, each label has multiple states. In the following example, the particular beam cost width identified by the pruning parameter processor 115 is one hundred.

The pruning parameter processor 115 can compute a beam cost width for label transition nodes. The label transition nodes are the nodes that correspond to a final states. In the lattice 500, the label transition nodes are the nodes that correspond to states a3, b4, c4, can d2. To compute the beam cost width for label transition nodes, the lattice generator calculates, in each frame, the difference between the minimum node cost of the label transition nodes and the node that is along the previously identified path. In lattice 500, there is label transition node in nodes of lattice frames 520, 525, and 530. In nodes of lattice frame 520, the label transition node corresponds to d2 and has a node cost of 90. In nodes of lattice frame 525, the label transition node corresponds to a3 and had a node cost of 90. In nodes of lattice frame 530, the label transition node corresponds to b4 and has a node cost of 145. The difference, in each frame, between the node costs of the nodes of the label transition nodes and the node of the previously identified path is shown in Table 3.

TABLE 3

| Frame | 515 | 520 | 525 | 530 |
|---|---|---|---|---|
| Label transition beam cost width for label transition nodes | N/A | N/A | 20 | N/A |

The lattice generator 110 identifies the maximum beam cost width for label transition nodes of each lattice from the training corpus 105 and ranks them. The lattice generator 110 applies a loss parameter to the sorted values to obtain a particular label transition beam cost width for label transition nodes. In this example, the loss parameter is 0.02, so the lattice generator 110 discards two percent of the values or the highest two values as shown by the selection of 80 in Table 4. In some implementations, a different loss parameter may be used than in the method described above.

TABLE 4

| | Label transition beam cost width for label transition nodes |
|---|---|
| 1 | 100 |
| 2 | 95 |
| 3 | 80 |
| ... | |
| 100 | 0 |

The lattice generator 110 stores a penalty factor in the pruning parameter storage 125. The penalty factor is the based on the difference between the particular label transition beam cost width for label transition nodes and the particular label transition beam cost width, which in this example is 20. The fraction of the difference to the particular beam cost width is the penalty factor. In this example, the penalty factor is 20/100 or 0.2.

With the particular beam cost width and the penalty factor, the lattice generator 110 generates lattices from the data corpus 130. The lattice generator 110 applies the particular beam cost width to each node using a similar method as described above.

For label transition nodes, or nodes that correspond to a final state of a label, the lattice generator 110 applies the particular beam cost width decreased by the penalty factor. In this example, the particular beam cost width is 100 and the penalty factor is 0.2, so the particular beam cost width is reduced by 20 for label transition nodes. Thus, the lattice generator 110 generates the lattice frame by frame and prunes, in each frame, the non-label transition nodes that have a node cost greater than 100 above the node with the lowest cost and prunes the label transition nodes that have a node cost greater than 80 above the node with the lowest cost.

Figure 5D:
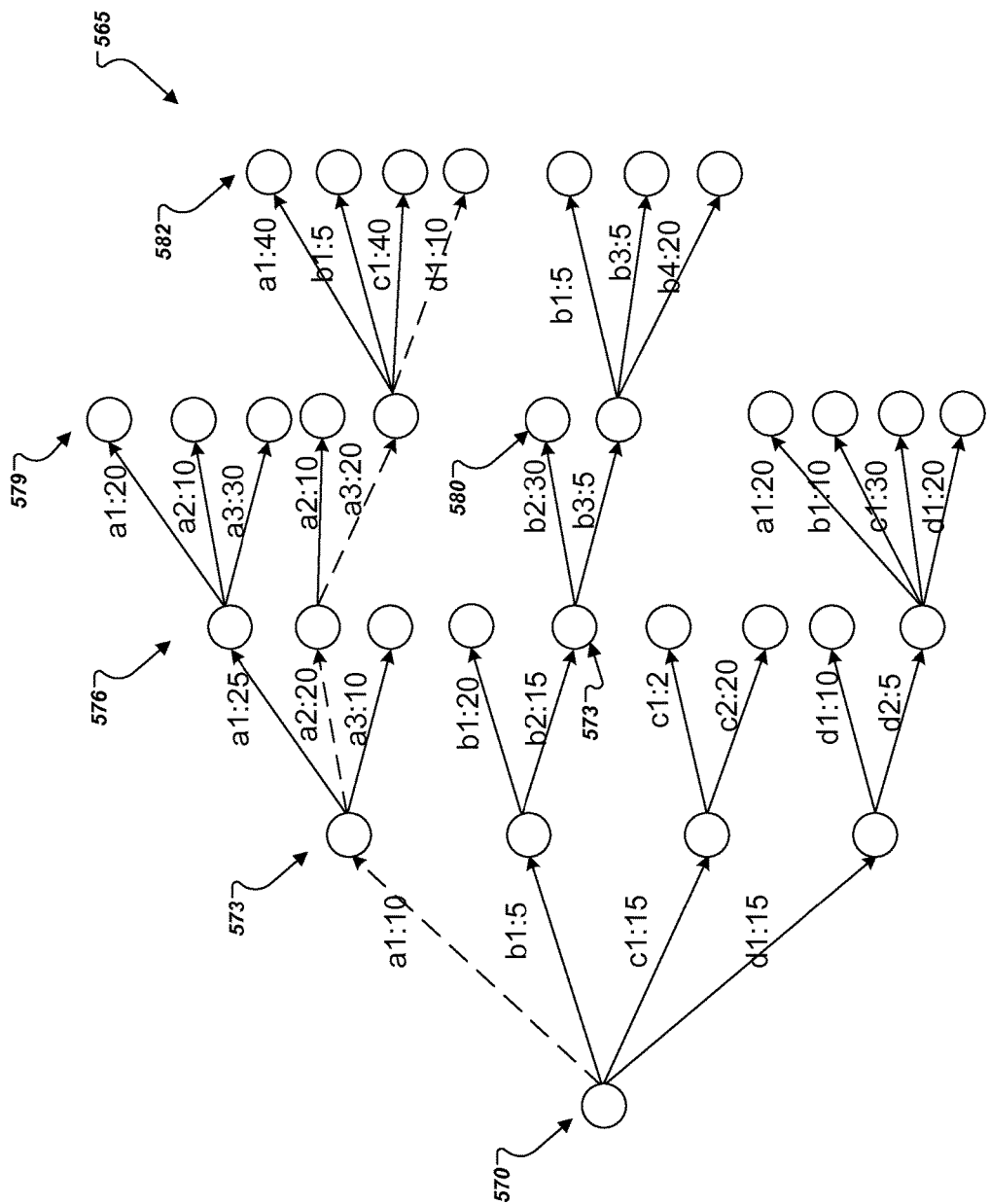

FIG. 5D illustrates an example lattice 565 with costs for each directional arc that are independent from the previous context. A directional arc is independent from the previous context when the cost associated with the arc does not depend on the previous node. In other words, the cost of a directional arc that is independent from the previous context is related to the probability that a particular state of a label corresponds to the text frame. Therefore, in lattice 565, the costs associated with each label are the same for a particular frame. For example, the costs associated with directional arcs for state a2 in frame 579 have a directional arc cost of 10 and the directional arcs for state a1 in frame 579 have a directional arc cost of 20. In other frames directional arcs for state a1 may have a different cost, such as in frame 582.

With lattice 565 and the directional arcs populated with costs, the pruning parameter processor 115 computes a label selection beam size and a label selection beam cost width. To compute the both values, the pruning parameter processor 115 performs a similar computation to calculating beam size and beam cost with for the lattice 200. For label selection beam size and a label selection beam cost width the label cost for each node is the directional arc cost of the directional arc that is pointing to the node. For example, the label cost of node 580 is 30 and the label cost of node 573 is 15. With a label cost assigned to each node and the previously identified path, the pruning parameter processor 115 can compute a label selection beam size and a label selection beam cost width. The values for each are shown in the following Table 5.

TABLE 5

| Frame | 573 | 576 | 579 | 582 |
|---|---|---|---|---|
| Label selection beam size | 2 | 2 | 7 | 3 |
| Label selection beam cost width | 5 | 8 | 15 | 5 |

Similar to the computations involving lattice 200, the pruning parameter processor 115 identifies a label selection beam size and a label selection beam cost width for the lattices generated from training corpus 105. The pruning parameter processor 115 computes a particular label selection beam size and a particular label selection beam cost width using the loss parameter. For example, if the loss parameter is 0.02, then the pruning parameter processor 115 will select a particular label selection beam size and a particular label selection beam cost width that corresponds to the 98th percentile of the ranked label selection beam sizes and ranked label selection beam cost widths. In some implementations, the loss parameter is different than the loss parameter used in the above described methods.

The lattice generator 110 may now generate new lattices based on the data from the data corpus 130. When processing each frame the lattice generator 110 can consider the cost of each arc that is independent from the previous context as the cost for each label. The lattice generator 110 does not produce arcs which are associated with labels that have a cost that is greater than the lowest label cost for the frame plus the particular label selection beam cost width. The lattice generator 110 does not produce arcs which associated with labels that are outside of the label selection beam size. For example, if the particular label selection beam size is ten, then the lattice generator produces arcs only for labels with the lowest ten costs.

Each of the above discusses pruning techniques, beam size, beam cost width, label transition beam cost width, label selection beam cost width, and label selection beam size may be computed in any combination by the pruning parameter processor 115. In turn, the lattice generator 110 may use any of the values in any combination determined from the pruning techniques to prune lattices as the lattice generator 110 generator generates them.

Figure 7:
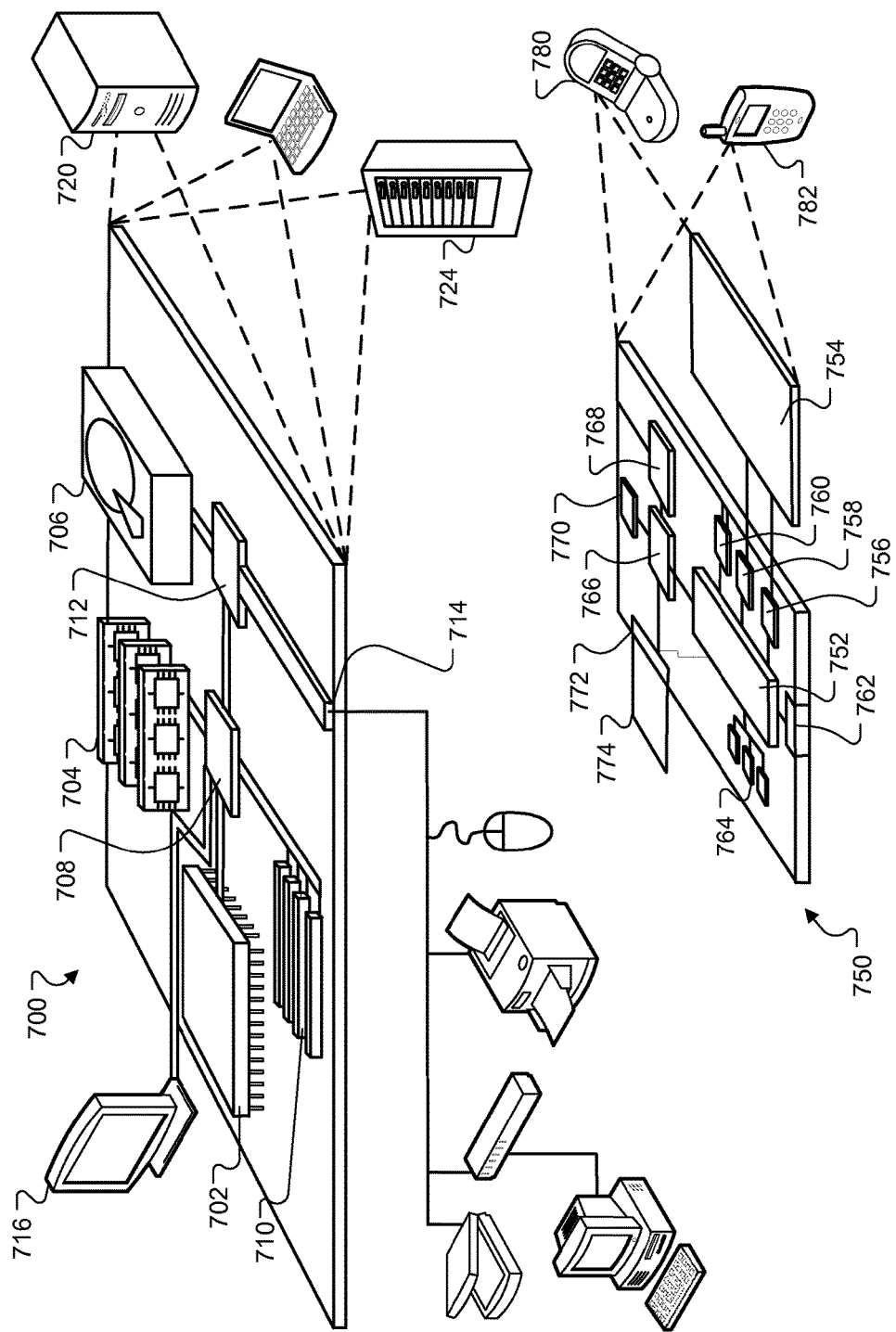
FIG. 7 shows an example of a computing device and a mobile computing device.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A computer-implemented method comprising:
receiving, by one or more computers, lattice data that defines a plurality of lattices, each lattice beginning with a start node and ending in an end node, wherein the start node and the end node are separated by one or more frames, each frame having corresponding frame nodes, wherein the nodes of each frame are connected to nodes of other frames, the start node or the end node by directional arcs, each directional arc corresponding to a respective weight;

for each defined lattice:
determining, by the one or more computers, a particular path that traverses the lattice, wherein the particular path identifies a particular directional arc in each frame and defines a path from the start node to the end node;
at each frame node, determining, by the one or more computers, a node cost of a path from the start node to the frame node, the node cost based on the respective weights of the directional arcs in the path from the start node to the frame node;
determining, by the one or more computers, a beam size for each frame, wherein the beam size corresponds to the number of frame nodes in the frame having an node cost equal to or less than the node cost of the frame node that is in the particular path;
determining, by the one or more computers, a beam cost width for each frame, wherein the beam cost width corresponds to a difference between the node cost of the frame node that is the particular path and a minimum of the node costs of the frame nodes in the frame;
determining, by the one or more computers, a maximum beam size from the beam sizes determined for frames; and
determining, by the one or more computers, a maximum beam cost width from the beam cost widths determine for the frames;

ranking, by the one or more computers, the maximum beam sizes determined from the lattices;

ranking, by the one or more computers, the maximum beam cost widths determined from the lattices;

selecting, by the one or more computers, a particular beam size and a particular beam cost width that corresponds to a particular percentile of the ranked maximum beam sizes and the ranked maximum beam cost widths and storing them as pruning parameter values; and determining, by the one or more computers, paths for additional lattices using the pruning parameters of the particular beam size and the particular beam cost width to prune candidate paths.

2. The method of claim 1, wherein the particular path is a Viterbi path.

3. The method of claim 1, wherein the start node of each lattice connects to frame nodes of a first frame.

4. The method of claim 1, wherein the end node of each lattice connects to frame nodes of a last frame.

5. The method of claim 1, wherein the node cost of a frame node corresponds to a sum of the respective weights of the directional arcs in the path from the start node to the frame node.

6. The method of claim 1, wherein each frame of each lattice corresponds to at least a portion of a letter of text.

7. The method of claim 1, wherein each frame of each lattice corresponds to at least a portion of a word of a spoken utterance.

8. The method of claim 1, wherein a direction associated with each directional arc points from the start node of each lattice to the end node of each lattice.

9. The method of claim 1, wherein determining paths for additional lattices using the pruning parameters of the particular beam size and the particular beam cost to prune candidate paths comprises:

for each additional lattice and in each frame of each additional lattice:

pruning one or more frame nodes that are each associated with a node cost that is greater than a minimum node cost plus the particular beam cost width; and pruning a number of frame nodes that are each associated with a node cost that is greater than a node cost of a frame node with the lowest node cost, wherein the number of frame nodes is equal to the particular beam size.

10. A system comprising:

one or more computers and one or more storage devices storing instructions that are operable, when executed by the one or more computers, to cause the one or more computers to perform operations comprising:

receiving, by the one or more computers, lattice data that defines a plurality of lattices, each lattice beginning with a start node and ending in an end node, wherein the start node and the end node are separated by one or more frames, each frame having corresponding frame nodes, wherein the nodes of each frame are connected to nodes of other frames, the start node or the end node by directional arcs, each directional arc corresponding to a respective weight;

for each defined lattice:

determining, by the one or more computers, a particular path that traverses the lattice, wherein the particular path identifies a particular directional arc in each frame and defines a path from the start node to the end node;

at each frame node, determining, by the one or more computers, a node cost of a path from the start node to the frame node, the node cost based on the respective weights of the directional arcs in the path from the start node to the frame node;

determining, by the one or more computers, a beam size for each frame, wherein the beam size corresponds to the number of frame nodes in the frame having an node cost equal to or less than the node cost of the frame node that is in the particular path;

determining, by the one or more computers, a beam cost width for each frame, wherein the beam cost width corresponds to a difference between the node cost of the frame node that is the particular path and a minimum of the node costs of the frame nodes in the frame;

determining, by the one or more computers, a maximum beam size from the beam sizes determined for frames; and determining, by the one or more computers, a maximum beam cost width from the beam cost widths determine for the frames;

ranking, by the one or more computers, the maximum beam sizes determined from the lattices;

ranking, by the one or more computers, the maximum beam cost widths determined from the lattices;

selecting, by the one or more computers, a particular beam size and a particular beam cost width that corresponds to a particular percentile of the ranked maximum beam sizes and the ranked maximum beam cost widths and storing them as pruning parameter values; and determining, by the one or more computers, paths for additional lattices using the pruning parameters of the particular beam size and the particular beam cost width to prune candidate paths.

11. The system of claim 10, wherein the particular path is a Viterbi path.

12. The system of claim 10, wherein the start node of each lattice connects to frame nodes of a first frame.

13. The method of claim 10, wherein the end node of each lattice connects to frame nodes of a last frame.

14. The method of claim 10, wherein the node cost of a frame node corresponds to a sum of the respective weights of the directional arcs in the path from the start node to the frame node.

15. The method of claim 10, wherein each frame of each lattice corresponds to at least a portion of a letter of text.

16. The method of claim 10, wherein each frame of each lattice corresponds to at least a portion of a word of a spoken utterance.

17. The method of claim 10, wherein a direction associated with each directional arc points from the start node of each lattice to the end node of each lattice.

18. The method of claim 10, wherein determining paths for additional lattices using the pruning parameters of the particular beam size and the particular beam cost to prune candidate paths comprises:

for each additional lattice and in each frame of each additional lattice:

pruning one or more frame nodes that are each associated with a node cost that is greater than a minimum node cost plus the particular beam cost width; and pruning a number of frame nodes that are each associated with a node cost that is greater than a node cost of a frame node with the lowest node cost, wherein the number of frame nodes is equal to the particular beam size.

19. A non-transitory computer-readable medium storing software comprising instructions executable by one or more computers which, upon such execution, cause the one or more computers to perform operations comprising:

receiving, by one or more computers, lattice data that defines a plurality of lattices, each lattice beginning with a start node and ending in an end node, wherein the start node and the end node are separated by one or more frames, each frame having corresponding frame nodes, wherein the nodes of each frame are connected to nodes of other frames, the start node or the end node by directional arcs, each directional arc corresponding to a respective weight;

for each defined lattice:
determining, by the one or more computers, a particular path that traverses the lattice, wherein the particular path identifies a particular directional arc in each frame and defines a path from the start node to the end node;
at each frame node, determining, by the one or more computers, a node cost of a path from the start node to the frame node, the node cost based on the respective weights of the directional arcs in the path from the start node to the frame node;
determining, by the one or more computers, a beam size for each frame, wherein the beam size corresponds to the number of frame nodes in the frame having an node cost equal to or less than the node cost of the frame node that is in the particular path;
determining, by the one or more computers, a beam cost width for each frame, wherein the beam cost width corresponds to a difference between the node cost of the frame node that is the particular path and a minimum of the node costs of the frame nodes in the frame;
determining, by the one or more computers, a maximum beam size from the beam sizes determined for frames; and
determining, by the one or more computers, a maximum beam cost width from the beam cost widths determine for the frames;

ranking, by the one or more computers, the maximum beam sizes determined from the lattices;

ranking, by the one or more computers, the maximum beam cost widths determined from the lattices;

selecting, by the one or more computers, a particular beam size and a particular beam cost width that corresponds to a particular percentile of the ranked maximum beam sizes and the ranked maximum beam cost widths and storing them as pruning parameter values; and determining, by the one or more computers, paths for additional lattices using the pruning parameters of the particular beam size and the particular beam cost width to prune candidate paths.

20. The method of claim 19, wherein the particular path is a Viterbi path.

* * * * *